United States Patent [19]
Tsubota et al.

[11] Patent Number: 4,849,839
[45] Date of Patent: Jul. 18, 1989

[54] MAGNETIC TAPE RECORDING AND/OR REPRODUCING APPARATUS ROTARY HEAD ASSEMBLY HAVING SWEEPING DEVICE

[75] Inventors: Tetsuro Tsubota, Tokyo; Yukio Kubota, Kanagawa, both of Japan

[73] Assignee: Sony Corporation, Tokyo, Japan

[21] Appl. No.: 854,810

[22] Filed: Apr. 23, 1986

[30] Foreign Application Priority Data

Apr. 30, 1985 [JP] Japan ................................. 60-091078
Nov. 7, 1985 [JP] Japan ................................. 60-249769

[51] Int. Cl.$^4$ ............................................. G11B 5/027
[52] U.S. Cl. .................................. 360/84; 360/130.22
[58] Field of Search .................. 360/130.24, 130.21, 360/130.23, 84-85, 95, 128, 137

[56] References Cited

U.S. PATENT DOCUMENTS

| T941,022 | 12/1975 | Freeman et al. | 360/130.24 |
| 4,164,764 | 8/1979 | Joannoy | 360/119 |
| 4,188,649 | 2/1980 | Cheatham et al. | 360/119 |
| 4,257,076 | 3/1981 | Shimizu et al. | 360/130.24 |
| 4,306,261 | 12/1981 | Beigmans et al. | 360/84 |
| 4,524,402 | 5/1985 | Ueda et al. | 360/84 |

FOREIGN PATENT DOCUMENTS

| 2813193 | 10/1978 | Fed. Rep. of Germany | 360/107 |
| 0020905 | 2/1978 | Japan | 360/130.24 |
| 0199432 | 11/1983 | Japan | 360/84 |
| 0212885 | 10/1985 | Japan | 360/97 |

Primary Examiner—Stuart N. Hecker
Assistant Examiner—David J. Severin
Attorney, Agent, or Firm—Ronald P. Kananen

[57] ABSTRACT

A rotary head assembly is provided with a sweeper member upstream of a magnetic head with respect to the direction of feed of magnetic tape which serves to remove dust, grit and so forth from the tape surface. The aforementioned member is provided with a surface lying oblique to the tape axis so as to effectively scrape off the dust, grit and so forth.

12 Claims, 6 Drawing Sheets

4,849,839

MAGNETIC TAPE RECORDING AND/OR REPRODUCING APPARATUS ROTARY HEAD ASSEMBLY HAVING SWEEPING DEVICE

BACKGROUND OF THE INVENTION

The present invention relates generally to a magnetic tape recording and/or reproducing apparatus. More specifically, the invention relates to a helical-scan recording and/or reproducing apparatus for a magnetic tape. Still more particularly, the invention relates to a rotary head assembly for a helical-scan recording and/or reproducing apparatus, which can eliminate wearing and/or deterioration of the magnetic tape due to dust, grit and so forth which may collect on the magnetic tape surface.

As is well known, a helical-scan magnetic tape recording and/or reproducing apparatus, such as a video tape recorder (VTR), employs a rotary head assembly having a rotary drum which supports magnetic heads. A magnetic tape is wrapped or wound around the periphery of the rotary head assembly. In general, when the apparatus is designed for both recording and reproduction, an erase head and a recording and play-back head are installed on the periphery of the rotary drum. The magnetic tape wrapped around the periphery of the rotary drum assembly is fed between supply and take-up reels while remaining in contact with the erase head and the recording and play-back head.

Since the erase head and the recording and play-back head have rounded heads, they tend to leave gaps with the tape surface. Dust and the like thus tends to accumulate in those gaps and may form deposits on the magnetic tape surface. Accumulated dust, grit and such in those gaps disrupts the accurate spacing between the magnetic head and the tape surface and degrades the recording and reproducing characteristics of the apparatus or, in the worst case, may cause a drop-out of recorded signals. Furthermore, dust and the like accumulating in the gaps tends to wear and damage the tape surface.

SUMMARY OF THE INVENTION

Therefore, it is an object of the present invention to provide a recording and/or reproducing apparatus for magnetic tape which solves the aforementioned problem.

Another and more specific object of the invention is to provide a rotary head assembly for a helical-scan recording and/or reproducing apparatus which eliminates the influence of dust, grit and the like which may otherwise be deposited on the magnetic tape surface.

In order to accomplish the aforementioned and other objects, a rotary head assembly, according to the present invention, is provided with a member upstream of a magnetic head with respect to the direction of feed of magnetic tape which serves to remove dust, grit and so forth from the tape surface.

In the preferred construction, the aforementioned member is provided with a surface lying oblique to the tape axis so as to effectively collect or scrape off the dust, grit and so forth from the tape surface.

According to one aspect of the invention, a head drum assembly having a rotary magnetic head about which a magnetic tape is wrapped comprises guide means having a face oblique to the direction of rotation of the magnetic head, and a supporting member supporting the magnetic head and the guide means and rotating about the axis of the head drum. The supporting member has portions between the magnetic head and the guide means which prevent any contact with the magnetic tape other than with the magnetic head and the guide means. Preferably, the guide means is an erase head. In the preferred embodiment, the guide means is made of Permalloy.

In alternative embodiments, the portions are grooves cut into the supporting member, or clearances in the supporting member.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments illustrated but are for explanation and understanding only.

In the drawings.

DESCRIPTION OF THE PREFERRED EMBODIMENTS

Figure 1:
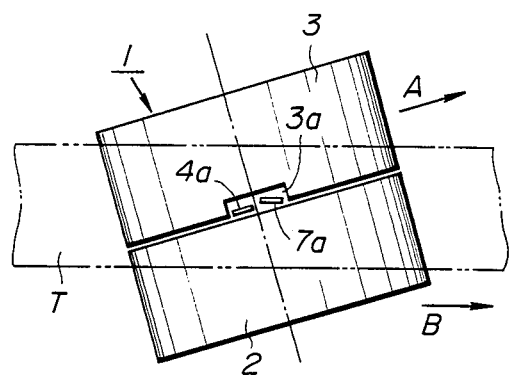
FIG. 1 is a front elevation of the first embodiment of a rotary head assembly according to the present invention.
Figure 2:
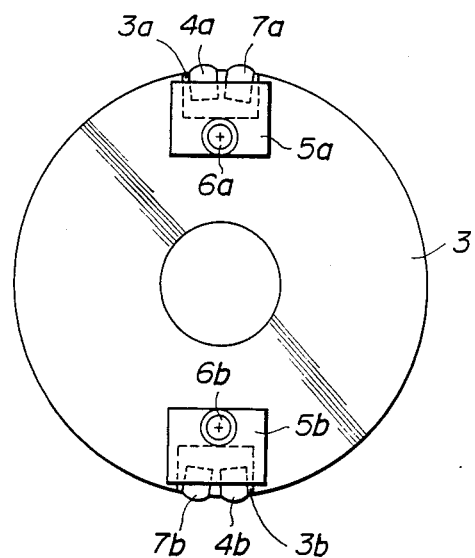
FIG. 2 is a bottom view of an upper drum of the first embodiment of the rotary head assembly of FIG. 1.

Referring now to the drawings, particularly to FIGS. 1 and 2, a rotary head assembly 1 generally comprises a stationary lower drum 2 and a rotary upper drum 3. The rotary upper drum 3 has a lower surface mating with the upper surface of the stationary lower drum 2 and has recesses 3a and 3b in its lower peripheral edge. Magnetic heads 4a and 4b, such as an erase head and a record/playback head, are received within the respectively corresponding recesses 3a and 3b.

As will be seen from FIG. 1, the rotary head assembly 1 is aligned with its axis oblique to an axis of tape feed. The rotary drum 3 is free to rotate with the magnetic heads 4a and 4b about the axis of the rotary head assembly 1. Therefore, the track of the magnetic head (shown by the arrow A) across the magnetic tape T is oblique to the tape feed axis (shown by the arrow B) so as to define a series of oblique scanning tracks across the magnetic tape T, according to the well-known helical-scan technique.

Figure 3:
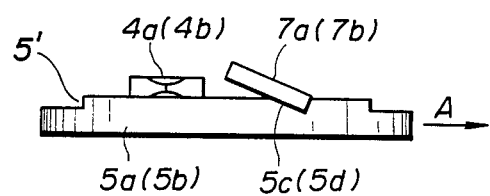
FIG. 3 is an enlarged front elevation of a magnetic head base accompanying a magnetic head and a sweeper member, in the first embodiment of the rotary head assembly of FIG. 1.

As shown in FIGS. 2 and 3, each of the magnetic heads 4a and 4b is fixedly mounted on a head base 5a and 5b, which is, in turn, secured to the lower surface of the upper drum 3 by means of fastening screws 6a and 6b. The head bases 5a and 5b have thicker central sections 5' with a thickness essentially corresponding to the depth of the recesses 3a and 3b. The central sections 5' of the head bases 5a and 5b support the magnetic heads 4a and 4b and engage the corresponding recesses 3a and 3b. As will be appreciated from FIG. 3, the magnetic heads 4a and 4b are offset to the trailing side of the center of the head bases 5a and 5b relative to the rotational direction of the rotary drum 3 during recording and reproduction. Oblique indentations or recesses 5c and 5d are formed at points offset to the leading side of the center of the head bases 5a and 5b with respect to rotary drum rotation during recording and reproduction. The recesses 5c and 5d have floors tilting upward toward the edge nearer the magnetic heads 4a and 4b. Sweeper members 7a and 7b are received in the recesses 5c and 5d and thereby fixedly mounted on the head bases 5a and 5b within the recesses 3a and 3b together with the magnetic heads 4a and 4b. The sweeper members constitute guide means for the magnetic heads leading the latter. The sweeper members 7a and 7b have sweeping faces adapted to sweep away dust, grit and the like deposited on the surface of the magnetic tape.

The sweeper members 7a and 7b are made of a highly wear-resistant material, such as Permalloy. The sweeper members 7a and 7b have essentially the same shape and weight as the magnetic heads 4a and 4b. Providing the sweeper members 7a and 7b with essentially the same shape and weight helps maintain the balance of the rotary drum 3 for uniform rotation. The sweeper members 7a and 7b are mounted on the head bases 5a and 5b in such a manner that the sweeping faces thereof lie in planes oblique to the planes of the magnetic heads 4a and 4b, which lie essentially parallel to the direction of rotation and to the upper surfaces of the head bases 5a and 5b. The sweeper members 7a and 7b are thus tilted upwards toward the corresponding magnetic heads 4a and 4b so as to provide a wider contact area than that of the magnetic heads, as seen in FIG. 1. The preferred tilt angle of the planes of the sweeper members 7a and 7b relative to the upper surfaces of the corresponding head bases 5a and 5b is in the range of 15° to 20°. This widened area of contact between the sweeper members 7a and 7b and the magnetic tape T in comparison with the contact area with the magnetic heads 4a and 4b assures sweeping of dust, grid or the like deposited on the contact area of the magnetic heads.

Figure 4A:
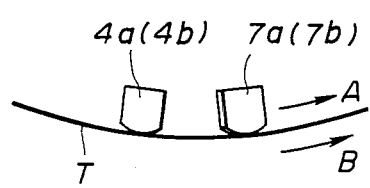
FIGS. 4(A) and 4(B) are diagrams of the arrangement of the magnetic head and the sweeper member in practical use.
Figure 4B:
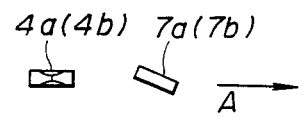

The rotary drum is driven to rotate in the direction A labelled in FIG. 1 and at the same time, the magnetic tape T is driven in the direction B as shown in FIGS. 4(A) and 4(B) for recording and reproduction. The rotation speed of the rotary drum 3 is essentially higher than the feed rate of the magnetic tape T according to the helical-scan technique. During scanning, the sweeper members 7a and 7b remain in constant contact with the magnetic tape surface in front of the magnetic heads 4a and 4b. Therefore, the magnetic tape surface exposed to the magnetic heads 4a and 4b is cleaned by the sweeper members 7a and 7b before the magnetic heads come into contact therewith.

Therefore, influence of the dust, grit and so forth which may be deposited on the magnetic tape surface can be satisfactorily and successfully eliminated.

Figure 5:
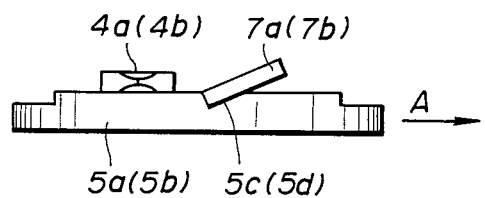
FIG. 5 is an enlarged front elevation similar to FIG. 3, but showing a major part of the second embodiment of a rotary head assembly according to the invention.

FIG. 5 shows a modification to the foregoing first embodiment of the rotary head assembly according to the present invention. In this modification, the direction of tilt of the sweeper member 7 is reversed, compared to that shown in FIG. 3. Specifically, in this modification, the sweeper member 7 slants upwards toward the edge remote from the magnetic head 4 on the head base 5. This modification exhibits essentially the same sweeping effect on the magnetic tape surface as achieved in the foregoing first embodiment.

As in the foregoing first embodiment of FIGS. 1 to 3, the magnetic heads 4a and 4b are fixedly mounted on a head base 5a and 5b, which is, in turn, secured onto the lower surface of the upper drum 3 by means of fastening screws 6a and 6b. The head bases 5a and 5b respectively have thicker central sections 5' with projecting thicknesses essentially corresponding to the depth of the recesses 3a and 3b. The central sections 5' of the head bases 5a and 5b support the magnetic heads 4a and 4b and engage the corresponding recesses 3a and 3b. The magnetic heads 4a and 4b are again offset from the centers of the head bases 5a and 5b toward the trailing edge relative to the rotational direction of the rotary drum 3 during recording and reproduction. The recesses 5c and 5d are also offset from the center of the head bases 5a and 5b, but toward the leading edge with respect to rotary drum rotation during recording and reproduction. The recesses 5c and 5d have slanted floors slanting upward the edge remote from the magnetic heads 4a or 4b. Sweeper members 7a and 7b are received in the recesses 5c and 5d and thereby fixedly mounted on the head bases 5a and 5b within the recesses 3a and 3b together with the magnetic heads 4a and 4b. The sweeper members 7a and 7b have sweeping faces designed to sweep dust, grit and so forth attached on the surface of the magnetic tape.

The sweeper members 7a and 7b are mounted on the head bases 5a and 5b in such a manner that the sweeping faces lie in planes oblique to the planes of the magnetic heads 4a and 4b which lie essentially parallel to the direction of rotation and parallel to the upper surfaces of the head bases 5a and 5b. The sweeper members 7a and 7b are thus tilted upwardly toward the edge away from the corresponding magnetic heads 4a and 4b as mentioned previously. The preferred tilt of the planes of the sweeper members 7a and 7b relative to the upper surfaces of the corresponding head bases 5a and 5b is in the range of 15° to 20°. This widens the area of contact between the sweeper members 7a and 7b and the magnetic tape in comparision with the magnetic heads 4a and 4b.

Figure 6:
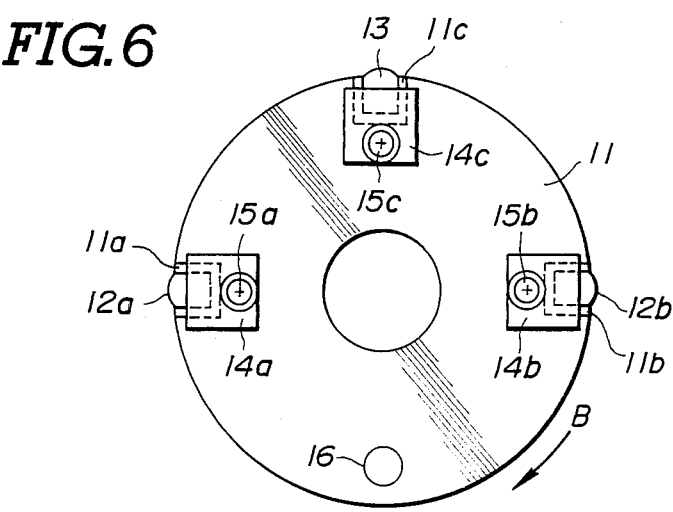
FIG. 6 is a bottom view of the third embodiment of a rotary head assembly according to the invention.
Figure 7:
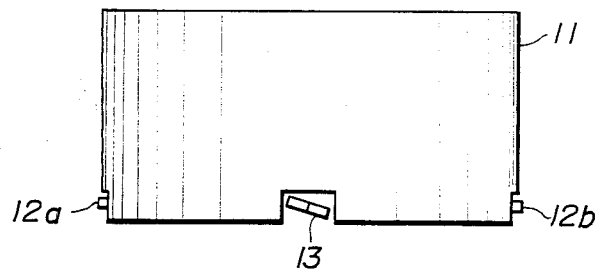
FIG. 7 is a rear elevation of the third embodiment of the rotary head of FIG. 6.

FIGS. 6 and 7 show the second embodiment of a rotary head assembly according to the invention. In the second embodiment, an upper rotary drum 11 is formed with recesses 11a, 11b and 11c in its lower peripheral edge. In practice, the recesses 11a, 11b are 11c are regularly spaced at 90° intervals. Magnetic heads 12a and 12b are fixed to head bases 14a and 14b which are secured to the lower surface of the upper rotary drum 11 by means of fastener screws 15a and 15b. The head bases 14a and 14b have head supporting projecting sections conforming to the corresponding recesses 11a and 11b. Each of the head supporting projecting sections has a plane surface onto which the magnetic heads 12a and 12b are fixedly mounted. The head supporting projecting sections of the head bases 14a and 14b are received within the recesses 11a and 11b of the rotary drum 11, with the magnetic heads 12a and 12b. As will be appreciated from FIG. 6, the magnetic heads 12a and 12b diametrically oppose each other.

A sweeper member 13 is fixedly mounted on a head base 14c which is fixed to the lower surface of the rotary drum 11 by means of a fastening screw 15c. In the shown embodiment, the sweeper member 13 may comprise an eraser head. As will be apparent from FIG. 6, the recess 11c is on the leading side of one of the recesses, namely the recess 11b, which receives the record/playback head. Therefore, the sweeper member 13 brushes the magnetic tape surface in front of the record/playback head, and, at the same time, erases preliminarily recorded data. The head base 14c mounting the sweeper member 13 has a projecting sweeper member support section. The sweeper member support section conforms to the recess 11c. The sweeper member support section has a tapered recess in its upper surface which receives one transverse edge of the sweeper member 13 in essentially the same manner as recited in FIGS. 3 and 5. The sweeper member 13 is thus received within the recess 11c between the recesses 11a and 11b. A balance weight 16 is affixed to the lower surface of the upper drum 3 at a point diametrically opposite the sweeper member 13. The balance weight 16 has essentially the same weight of the sweeper member 13 so as to keep the moment of inertia of the rotary drum radially symmetrical.

During recording and reproduction, the rotary drum 11, and thus the magnetic head 12a, the magnetic head 12b and the sweeper member 13, rotates clockwise as viewed in FIG. 6. The magnetic tape runs in the direction labelled "B". The sweeper member 13 contacts one or more tracks on the magnetic tape to be accessed by the magnetic head 12b before the magnetic head 12b comes into contact therewith for sweeping dust, grit and so forth deposited on the magnetic tape surface and, at the same time, erases pre-recorded data.

As shown in FIG. 7, the magnetic heads 12a and 12b are mounted essentially parallel to the lower peripheral edge of the rotary drum 11. On the other hand, the sweeper member 13 is mounted oblique to the lower peripheral edge of the rotary drum. As in the previous embodiment, canting the sweeper member 13 relative to the magnetic heads 12a and 12b increases the area of sweep relative to the scanning area of the magnetic heads 12a and 12b and thus ensures cleaning of the scanning area of the magnetic heads.

Figure 8:
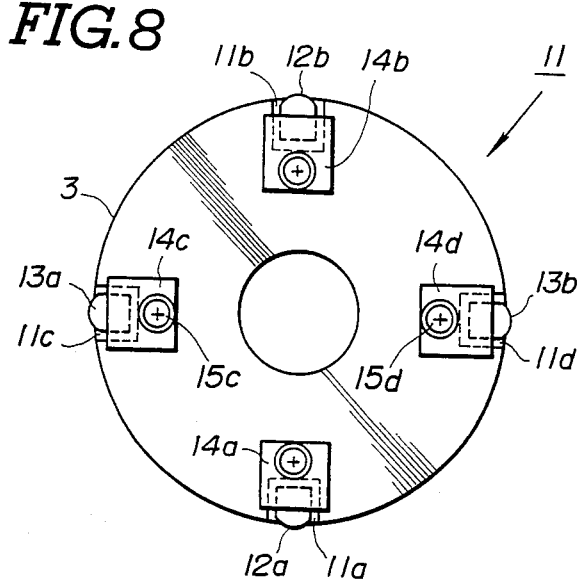
FIG. 8 is a bottom view of the upper drum of a modification to the third embodiment of the rotary head assembly.
Figure 9:
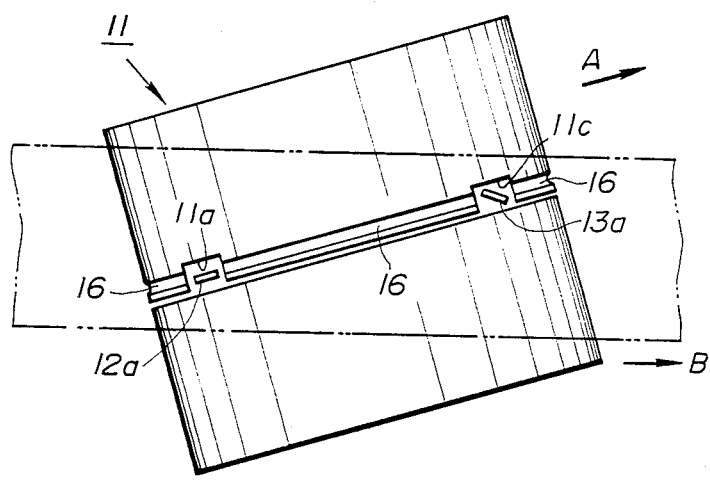
FIG. 9 is a front elevation of the rotary head assembly of FIG. 8.
Figure 10:
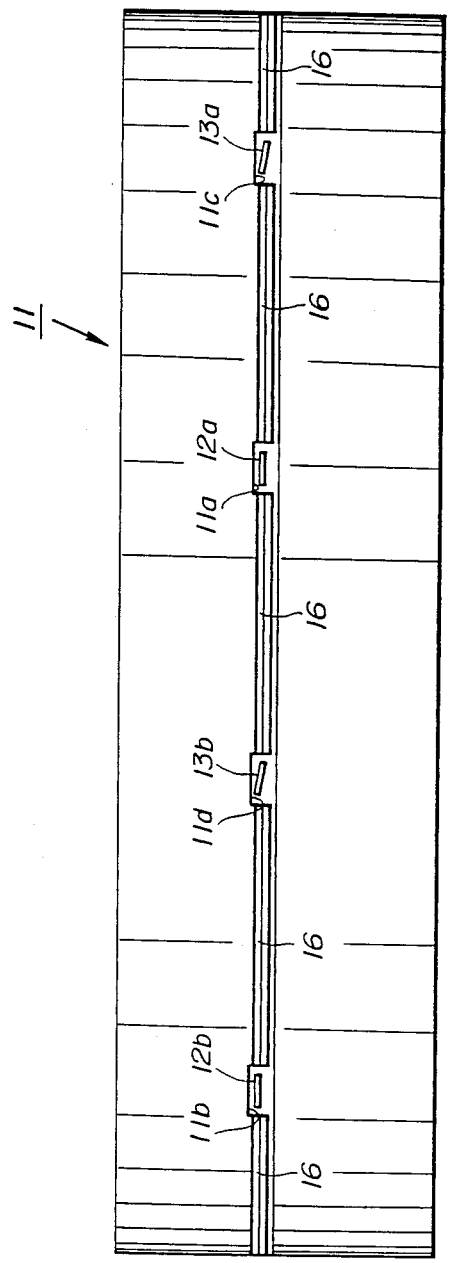
FIG. 10 is an equatorial projection of the rotary drum of FIGS. 8 and 9.

FIGS. 8, 9 and 10 show a modification to the foregoing second embodiment of a rotary head assembly according to the present invention. In this embodiment, a pair of sweeper members 13a and 13b are provided at diametrically opposing points on the lower peripheral edge of the rotary drum 11 within recesses 11c and 11d in the lower peripheral edge of the rotary drum. Similar to the foregoing second embodiment, the sweeper members 13a and 13b can be eraser heads for erasing data recorded on the magnetic tape. The sweeper members 13a and 13b are mounted on head bases 14c and 14d which are, in turn, secured to the lower surface of the rotary drum 11 by means of the fastening screws 15c and 15d. A groove 16 in the cylindrical face of the rotary drum 11 near the lower peripheral edge connects the recesses 11a, 11b, 11c and 11d. The groove 16 lies in the same plane as the magnetic heads.

During recording and reproduction, the sweeper members 13a and 13b contact the magnetic tape surface in front of the magnetic heads 12a and 12b in order to sweep dust, grit and so forth off the magnetic tape surface. As the sweeper members 13a and 13b pass a given point of the magnetic tape surface, that point comes into opposition with the groove 16 in the periphery of the rotary drum. The groove 16 prevents contact between the edge of the rotary drum and at least the scanning area of the magnetic tape. Therefore, it prevents dust, grit and so forth from being deposited on the magnetic tape surface after the sweeper members 13a and 13b have cleaned up the tape surface.

Figure 11:
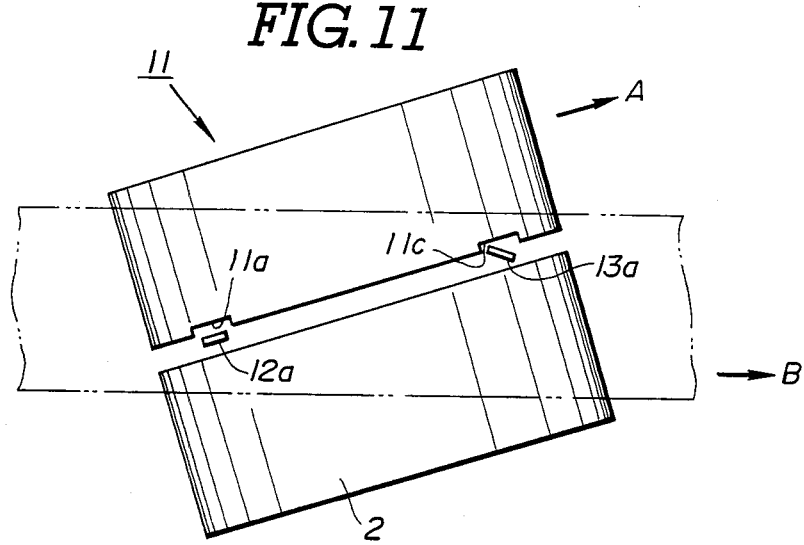
FIGS. 11 and 12 are front elevations of a further modification to the embodiment of FIGS. 8 and 9.

FIG. 11 shows an alternative embodiment of the rotary head assembly of FIGS. 8, 9 and 10. In this embodiment, the magnetic heads 12a and 12b and the sweeper members 13a and 13b are respectively received within corresponding recesses 11a, 11b, 11c and 11d in the lower peripheral edge of the rotary drum 11. The lower surface of the rotary drum 11 is separated from the upper surface of the stationary drum 2 by a clearance. The clearance between the lower surface of the rotary drum 11 and the upper surface of the stationary drum 2 is large enough to cover the scanning area of the magnetic heads 12a and 12b. Therefore, the clearance of this alternative embodiment serves essentially the same purpose as the groove 16 of the previous embodiment. Therefore, the edges of the rotary drum 11 and the stationary drum 2 never come into contact with the magnetic tape surface and thus keep the magnetic tape surface clean after the sweeper members 13a and 13b clean the dust, grit and so forth off the magnetic tape surface.

Figure 12:
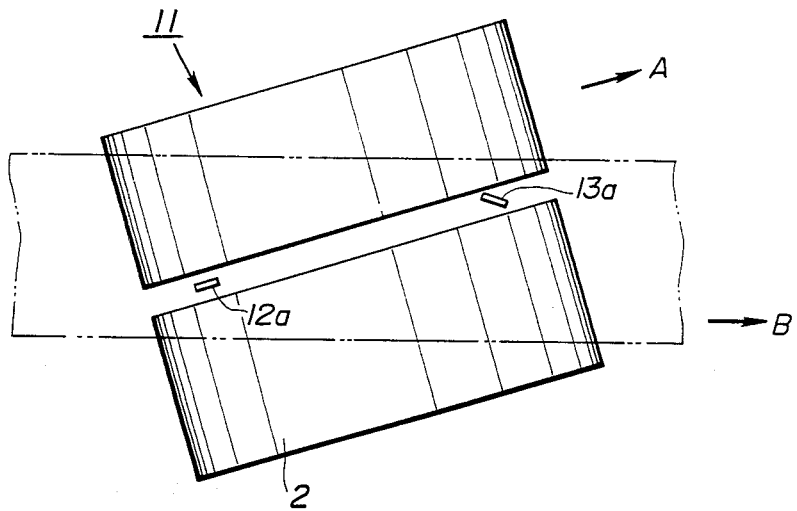

FIG. 12 shows a further alternative embodiment of the rotary head assembly of FIG. 11. This alternative embodiment features a wider clearance between the lower surface of the rotary drum 11 and the upper surface of the stationary drum 2 than in the previous embodiment of FIG. 11. The magnetic heads 12a and 12b and the sweeper members 13a and 13b are disposed within the clearance between the lower surface of the rotary drum 11 and the upper surface of the stationary drum 2 so that nothing other than the magnetic heads 12a and 12b will come into contact with the magnetic tape surface after the sweeper members 13a and 13b sweep the dust, grit and so forth off the magnetic tape surface.

Therefore, according to the present invention, the dust, grit and so forth which tends to be deposited on the magnetic tape surface can be successfuly swept by the sweeper member or guide means in order to maintain the reproduction level of the recording and/or reproducing apparatus and successfully avoid damaging of the magnetic tape and/or the magnetic head due to the dust, grit and so forth.

While the present invention has been disclosed in terms of the preferred embodiments in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A rotary head assembly which includes a rotating drum for rotating relative to a magnetic tape comprising:
   a magnetic head supported by said drum for recording data on said magnetic tape during rotation of said drum; and
   means supported by said drum and located in alignment with said magnetic head with respect to the rotary direction of the rotating drum for sweeping dust, grit, and the like from the surface of the magnetic tape during relative movement of said drum and said tape, said sweeping means including a sweeping face lying in a plane oblique to the rotary direction of said rotating drum.

2. The combination as set forth in claim 1, wherein said sweeping face is tilted upwardly away from said magnetic head.

3. The combination as set forth in claim 1, wherein said sweeping face is tilted upwardly toward said magnetic head.

4. The device as set forth in claim 1, wherein said sweeping face lies at an angle to the rotary direction of said rotating drum in a range of about 15 degrees to about 20 degrees.

5. The device as set forth in claim 1, wherein at least a pair of said magnetic heads are supported by said rotating drum, said sweeping means including a sweeper member located intermediate said magnetic heads, and further including a weighted member located on said drum opposite to said sweeper member.

6. The device as set forth in claim 1, wherein at least a pair of said magnetic heads are supported by said rotating drum, said sweeping means including a pair of sweeper members located opposite one another and alternately located relative to said pair of magnetic heads.

7. The device as set forth in claim 6, wherein said sweeper members are erase heads.

8. The device as set forth in claim 1, wherein said sweeping means is made of Permalloy.

9. The device as set forth in claim 1, further comprising means for preventing contact of said head drum assembly with the magnetic tape between said sweeping means and said magnetic head.

10. The device as set forth in claim 1, further comprising:
    a drum face on said rotary drum;
    a first recess in said drum face, said magnetic head being positioned in said first recess;
    a second recess in said drum face, said sweeping face being positioned in said second recess; and
    a groove in said drum face interconnecting said recesses.

11. The device as set forth in claim 1, wherein said rotary head assembly further comprises a stationary drum, said rotating drum and said stationary drum including opposing surfaces, and a clearance between said opposing surfaces, said magnetic head and said sweeping face being positioned in said clearance.

12. A rotary head assembly for a recording and/or reproducing apparatus comprising:
    a rotary head assembly which includes a stationary lower drum and a rotary upper drum, said upper drum having a lower surface mating with the upper surface of said lower drum and defining recesses in its lower peripheral edge for receiving magnetic heads therein;
    magnetic heads supported in said recesses and rotatable with said rotary upper drum about an axis of said rotary head assembly so that the trace of the magnetic heads across a magnetic tape is oblique to the axis of tape feed;
    means for supporting sweeper members in said recesses, said supporting means defining oblique indentations for receiving sweeper members therein; and
    sweeper members located in said oblique indentations in alignment with said magnetic heads with respect to the rotary direction of the rotary upper drum, said sweeper members having sweeping faces adapted to sweep dust, grit, and the like deposited on the surface of said magnetic tape.

* * * * *